United States Patent [19]

Özelli et al.

[11] Patent Number: 4,535,121

[45] Date of Patent: Aug. 13, 1985

[54] FLOCKING ADHESIVE FOR FLEXIBLE SUBSTRATES

[76] Inventors: Riza N. Özelli, Stephanusstrasse 37, 4040 Neuss 22; Hans-Josef Hoffmann, Moehlenring 63, 4152 Kempen 1; Hartmut Lippert, Geschwister-Scholl-Strasse 61, 4019 Monheim, all of Fed. Rep. of Germany

[21] Appl. No.: 622,601

[22] Filed: Jun. 20, 1984

[30] Foreign Application Priority Data

Jun. 24, 1983 [DE] Fed. Rep. of Germany ....... 3322695
Jan. 7, 1984 [DE] Fed. Rep. of Germany ....... 3400340

[51] Int. Cl.$^3$ .............................................. C08L 75/00
[52] U.S. Cl. ................................... 524/715; 524/872; 528/52; 528/67; 528/73
[58] Field of Search ....................... 524/236, 715, 872; 528/52, 73, 67

[56] References Cited

U.S. PATENT DOCUMENTS 3,878,134 4/1975 Özelli et al. ...................... 260/4 R

FOREIGN PATENT DOCUMENTS 2916909 10/1980 Fed. Rep. of Germany .
136079 11/1978 Japan .

Primary Examiner—Lewis T. Jacobs

[57] ABSTRACT

An adhesive for flocking elastomers, more especially apolar elastomers, such as EPDM. The adhesive contains an isocyanate-terminated polyurethane prepolymer and, as an adhesion promoter, a reaction product of an aromatic diisocyanate with a polyfunctional epoxide, particularly triglycidyl isocyanurate. The strength of adhesion and resistance of the bonds can be further increased by the addition of aromatic nitroso compounds, for example, 1,4-dinitrosobenzene.

11 Claims, No Drawings

FLOCKING ADHESIVE FOR FLEXIBLE SUBSTRATES

BACKGROUND OF THE INVENTION

1. Field of the Invention

This invention relates generally to adhesives and, more specifically, to a new adhesive which enables flocked, flexible articles, for example rubber profiles flocked with fibers, to be produced to higher quality standards.

2. Description of the Prior Art

It is known that vulcanized or unvulcanized elastomers or other plastic surfaces can be coated with a layer of adhesive and that short staple fibers can be applied perpendicularly thereof in an electrical field. The electrostatically flocked articles thus produced are distinguished by a fabric-like surface and, in many cases, by relatively low friction, for example with respect to glass. One of the many applications of these products is their installation as sealing sleeves in window compartments of automobiles.

To produce flocked, flexible articles of this type, it was proposed in German Pat. No. 29 16 909 to use a two-component adhesive of the reaction product of (meth)-acrylic acid and epoxidized polymers on the one hand and a compound containing amino groups on the other hand in conjunction with radiationhardening additives. With epoxy adhesives such as these, however, it is only possible to obtain minimal strengths on apolar elastomers, with the result that, in the event of mechanical stressing of the type encountered, for example, in the window compartments of automobiles during opening and closing of the windows, the flocks soon become detached from the adhesive layer. Accordingly, German Pat. No. 30 11 438 proposes using a primer together with an epoxy adhesive for flocking an apolar elastomer. The primer used is a solution of a chlorinated amorphous polypropylene in toluene. Although better results may possibly be obtained in this way, the procedure involved is relatively complicated.

Japanese Patent Applications No. 78 136 079 describes a process for flocking mixtures of ethylenepropylenediene terpolymers (EPDM) with an OH-functional butadiene elastomer using a polyurethane adhesive. However, even in the case of completely apolar elastomers, i.e. for example pure EPDM-elastomers, the proposed adhesive is unsuitable for producing abrasion-resistant flocked finishes, as required in practice.

DESCRIPTION OF THE INVENTION

An object of the present invention is to provide a new adhesive which enables apolar elastomers, particularly EPDM-elastomers, to be flocked in abrasion-resistant form and which in addition shows improved water resistance. Another object of the invention is to enable the adhesive to be used in the electrostatic flocking of vulcanized and unvulcanized elastomers.

Accordingly, the present invention relates to an adhesive for the electrostatic flocking of flexible substrates, wherein the adhesive contains:

(a) at least one isocyanate-terminated polyurethane prepolymer, (b) from about 10 to about 80% by weight, preferably from about 20 to about 50% by weight, based on the weight of component (a), of at least one reaction product of a polyfunctional epoxide with an aromatic diisocyanate, and, optionally, one or more of the following:

(c) an organic solvent,
(d) a dispersant, and
(e) other auxiliary materials.

As set forth above, the adhesives of the invention are based on polyurethane prepolymers containing terminal isocyanate groups. It has surprisingly been found that their adhesive effect and their resistance to the effects of weathering, particularly to water, can be distinctly improved by the addition of reaction products of polyfunctional epoxides with aromatic diisocyanates as adhesion promoters in the quantities given above. According to the invention, it is preferred to use reaction products which contain terminal isocyanate groups, i.e. which have been produced by reacting 1 mole of diisocyanate per mole of epoxide group. While certain of these reaction products may be known compounds, their adhesion-promoting effect in flocking adhesives is not known.

In a first embodiment of the invention, the reaction products of cyclic poly-N-glycidyl compounds with aromatic diisocyanates are used as the adhesion promoter (component (b) above). Particularly suitable reaction products of this type are the reaction products of (i) heterocyclic compounds containing two or more N-glycidyl groups, preferably wherein the nitrogen containing heterocyclic ring is a 5- or 6- numbered ring, for example triglycidyl isocyanurate, triglycidyl urazole, diglycidyl benzimidazolone, diglycidyl hydantoin and/or hydantoins containing condensed glycidyl groups with (ii) diphenylmethane diisocyanate, technical diphenylmethane diisocyanates having an isocyanate functionality of from 2.0 to 2.5, tolylene diisocyanate, paraphenylene diisocyanate or xylylene diisocyanate. These reaction products can be produced by mixing the starting materials together in the required molar ratio and letting the mixture react at elevated temperatures, for example in the range of from about 60° C. to about 110° C. if desired in the presence of solvents, until no more epoxide groups are present.

In another embodiment of the invention, the reaction products of polyfunctional epoxide compounds based on bisphenol A, for example the diglycidyl ether of bisphenol A, with an aromatic diisocyanate given above, in a molar ratio of 1:2, are used as the adhesion promoters.

In one particularly preferred embodiment, the invention relates to flocking adhesives which contain polyfunctional aromatic nitroso compounds as an auxiliary material (component (d)) for further improving adhesive strength and weather resistance. Polyfunctional aromatic nitroso compounds are known to those skilled in the use of adhesives in the field of elastomers. Their use in adhesives for vulcanizing rubber onto metals is described, for example, in German Pat. No. 2,228,544. However, it was not known that these products favorably affected the properties of flocking adhesives. Various polyfunctional aromatic nitroso compounds are suitable for use as a constituent of the improved adhesives of the invention. Compounds in which the nitroso groups are not attached to adjacent carbon atoms are preferred. Suitable nitroso compounds of this type are polyfunctional nitroso compounds of mononuclear or polynuclear aromatic compounds, i.e. polyfunctional nitroso compounds based for example on benzene, naphthalene, anthracene, biphenyl, or more highly condensed aromatic compounds. In addition to the nitroso groups, the polyfunctional aromatic nitroso compounds can also contain other substituents. Thus, compounds containing halogen atoms, such as chlorine, bromine, or fluorine; nitro groups; alkyl groups containing from 1 to 6 carbon atoms; cycloalkyl groups; aryl alkyl groups containing up to 8 carbon atoms; or alkoxy groups as further substituents can be used herein.

Dinitroso compounds have proven to be particularly effective in practice. Preferred dinitroso compounds are m-dinitrosobenzene, p-dinitrosobenzene, m-dinitrosonapthalenes, p-dinitrosonapthalene, 2,5-dinitroso-p-cymol, 2-methyl-1,4-dinitrosobenzene, 2-methyl-5-chloro-1,4-dinitrosobenzene, 2-fluoro-1,4dinitrosobenzene, 2-methoxy-1,3-dinitrosobenzene, 5-chloro-1,3-dinitrosobenzene, 2-benzyl-1,4-dinitrosobenzene and 2-cyclohexyl-1,4-dinitrosobenzene. Of the compounds given above, 1,4-dinitrosobenzene is generally used on practical grounds. In this connection, it has been found that both the pure compound and also the commercially available preparations consisting predominantly of 1,4-dinitrosobenzene are suitable for use herein.

The adhesives of the invention contain the polyfunctional aromatic nitroso compounds, when present, in quantities of from about 0.5 to about 4% by weight, based on the weight of the solvent-free adhesive. It is preferred to use from about 1.5 to about 2.5% by weight of the polyfunctional aromatic nitroso compounds, and particularly preferred to use from about 1.5 to about 2.5% by weight of 1,4-dinitrosobenzene or the corresponding quantity of compositions containing 1,4-dinitrosobenzene. The polyfunctional aromatic nitroso compounds can be used in the form of a solution or in the form of a dispersion in non-solvents in the production of the adhesives of the invention. 30 to 40% by weight solutions of dinitrosobenzene in, for example, xylene, toluene or methylisobutyl ketone, are suitable for use herein for numerous applications of the resulting adhesive.

The adhesives of the invention can be applied to or coated onto elastomers, although, in many cases, it is desirable to use preparations of lower viscosity. To that end, the prepolymers are dissolved in organic solvents (optional component (c)). Suitable solvents are, for example, xylene, toluene, methylisobutyl ketone and/or ethylene chloride. A solids content of from about 20 to about 50% by weight is usually employed, depending on the required viscosity.

In addition, the adhesives can also be made up into dispersions using known techniques. For example, the prepolymers can be stirred in an organic solvent (optional component (c)), for example in xylene, toluene, ketone mixtures or chlorinated hydrocarbons or mixtures thereof, at elevated temperatures, for example at temperatures in the range of from about 60° C. to about 80° C., to form smooth dispersions. Standard dispersants (optional component (d)) can also be added, for example copolymers of unsaturated amides and esters, or other dispersants commonly used in the production of lacquers.

The adhesives of the invention can be used as one-component or two-component polyurethane adhesives. Where they are used in the form of one-component preparations, they harden under the effect of moisture diffusing into the adhesive material from the surrounding atmosphere or from the fibers. However, hardening can also be obtained by the addition of a hardener component, for example a polyhydric alcohol or a polyfunctional amine. Suitable hardeners are polyesters, polyethers or polyamides containing terminal OH groups or terminal amino groups.

- As discussed above, the adhesives of the invention contain isocyanate-terminated polyurethane prepolymers (component (a)), which are known compounds. Various products of the type currently used in practice can be selected for the present adhesive compositions. Products of this type are, for example, polymers based on polypropylene glycol-diphenylmethane diisocyanate. It is preferred to use polypropylene glycols having a molecular weight of from about 500 to about 5000 and, preferably, from about 1000 to about 2000. Other isocyanate-terminated prepolymers that can be used herein include reaction products of castor oil (OH number approx. 161) with diphenylmethane diisocyanate or other aromatic diisocyanates. Reaction products of polybutadiene polyols with aromatic diisocyanates, particularly diphenylmethane diisocyanate, can also be employed herein. Particularly suitable polybutadiene polyols have molecular weights of from about 500 to about 6000 and more particularly from about 2000 to about 4000 and an OH number of, for example, from about 30 to about 80. Another group of isocyanateterminated polyurethane prepolymers that can be employed herein are the reaction products of aromatic diisocyanates, particularly diphenylmethane diisocyanate, with polytetrahydrofuran. Particularly suitable polytetrahydrofurans are those having a molecular weight of from about 500 to about 3000 and an OH number in the range of from about 50 to about 150. Reaction products of tolylene diisocyanate with mixtures of polypropylene glycol and castor oil can also be used as the isocyanate-terminated polyurethane prepolymers. Reaction products of polycaprolactone with aromatic diisocyanates, particularly diphenylmethane diisocyanate, can also be used herein. Suitable polycaprolactones are those having molecular weights of from about 500 to about 4000 and an OH number of from about 30 to about 80. Finally, numerous reaction products of aliphatic or aliphatic-aromatic polyesters having molecular weights of about 2000 and, more particularly, in the range of from about 1000 to about 8000, with aromatic diisocyanates, particularly diphenylmethane diisocyanate, are also suitable for use herein. In all of the above instances, diphenylmethane diisocyanate can be replaced with paraphenylene diisocyanate or xylylene diisocyanate. It is also possible to use an alcohol component as a hardener for the above polyurethane adhesives.

Unvulcanized elastomers can be flocked using the adhesives of the invention. To this end, mixtures of substances of the type normally prepared for vulcanization are used as starting materials. Mixtures such as these are known and, in addition to the polymers, contain standard auxiliary materials such as, for example, fatty acids, oxides of magnesium, calcium or zinc, vulcanization accelerators, other vulcanization aids, stabilizers, solvents, fillers, and the like. The unvulcanized articles are brought into the required form and coated with the adhesive. The fibers are then applied in an electrostatic field. After reaching an initial strength, vulcanization is carried out in the usual way, i.e. for from about 5 to about 60 minutes at temperatures in the range of from about 120° C. to about 180° C.; the adhesive hardening during the vulcanization process.

For coating vulcanized elastomers, i.e. rubber sheets for example, the flocking adhesive is applied by spraying or coating, after which the fibers are applied in an electrostatic field and the adhesive subsequently hardened for about 10 minutes at temperatures in the range of from about 100° C. to about 140° C.

Elastomers of various types and origin can be flocked before or after vulcanization using the adhesives of the invention. For example, it is possible to flock natural rubber and also polar rubbers, such as nitrile rubber, chlorobutadiene or chlorinated isoprenes. The adhesives are also suitable for flocking butyl rubber or elastomers based on styrene-butadiene or styrene-isoprene. However, the adhesives are preferably used for flocking apolar elastomers, particularly elastomers based on terpolymers of ethylene, propylene and diene monomers, such as for example diethylidene norbornene. Elastomers such as these are commercially available in various forms. In general, they are known collectively as EPDM-elastomers and have recently acquired increasing significance by virtue of their very favorable weathering properties.

The choice of the fibers which can be applied by means of the adhesives of the invention to the elastomers or even to other flexible substrates such as, for example, to polyethylene or polypropylene films or other films is not critical. Thus, polyester fibers, such as for example polyethylene glycol terephthalate, polyamide fibers such as, for example, nylon-6 or nylon-6.6, polyurethane fibers, rayon, cotton and/or cellulose fibers can be used for flocking. Staple fibers having an average length of from about 0.2 mm to about 2 mm are preferably used.

The flocked articles produced using the adhesives of the invention can be used for various applications. For example, it is possible to flock profiles of elastomers which are used for lining window compartments in the automotive industry. It is also possible to produce flocked mats or flocked flexible shafts, flocked floor coverings, flocked rubber gloves, tack boards for demonstration purposes, flocked clearer rollers for the spinning machine industry, textile sleeves, and the like.

The invention is illustrated by the following examples, which are given for that purpose only, and not for purposes of limitation.

EXAMPLES

Rubber mixtures A, B and C given below were used in the following Examples. The compositions of the mixtures and the vulcanization conditions were as follows:

| (A) | |
|---|---|
| Styrene-butadiene rubber | 50.0 parts |
| Chloroprene rubber | 50.0 " |
| Stearic acid | 1.0 " |
| MgO | 2.0 " |
| Mercaptobenzimidazole | 0.5 " |
| N—isopropyl-N'—p-phenylenediamine | 1.0 " |
| Hydrocarbon resin | 1.0 " |
| Carbon black | 140.0 " |
| Mineral oil (naphthenic) | 10.0 " |
| CaO surface-treated with stearic acid | 5.0 " |
| ZnO | 5.0 " |
| 2-mercaptoimidazoline | 0.5 " |
| Tetramethylthiuram monosulfide | 1.0 " |
| Di-o-tolyl guanidine | 0.5 " |
| Sulfur | 0.8 " |
| Vulcanization conditions: 160° C./10 minutes | |
| (B) | |
| 2-chlorobutadiene, Mooney viscosity ML (100° C.) 30–60 | 100.0 " |
| Stearic acid | 0.5 " |
| MgO | 4.0 " |
| Mercaptobenzimidazole | 0.5 " |
| N—isopropyl-N'—p-phenylene diamine | 1.0 " |
| Hydrocarbon resin | 1.0 " |
| Carbon black | 140.0 " |
| Naphthenic oils, viscosity at 50° C. 200 cSt | 10.0 " |
| CaO surface-treated with stearic acid | 5.0 " |
| ZnO | 5.0 " |
| Tetramethylthiuram monosulfide | 1.0 " |
| Di-o-tolyl guanidine | 1.0 " |
| Sulfur | 0.5 " |
| Vulcanization conditions: 160° C./20 minutes | |
| (C) | |
| Ethylene-propylene terpolymer rubber | 100.0 " |
| Stearic acid | 1.0 " |
| ZnO | 5.0 " |
| Carbon black | 100.0 " |
| CaO | 10.0 " |
| Chalk surface-treated with stearic acid | 50.0 " |
| Zinc mercaptobenzthiazole | 1.2 " |
| Zinc ethylphenyl dithiacarbamate | 3.0 " |
| Dipentamethylthiuram tetrasulfide | 2.0 " |
| Sulfur | 0.4 " |
| Vulcanization conditions: 160° C./10 minutes | |

Adhesives were prepared by dissolving and dispersing one or more of the following substances, as shown in Tables 1 and 1a, in an organic solvent mixture of xylene, toluene, methylisobutyl ketone, and ethylene chloride (ratio 1:1:1:1, 50% solids):

(1) Triglycidyl isocyanurate-diphenylmethane diisocyanate (=MDI)-adduct (molar ratio 1:3)
(2) Polypropylene glycol (molecular weight approx. 1000, OH number 110)-MDI adduct
(3) Castor oil (OH number 161, trifunctional)-MDI adduct
(4) Polybutadiene polyol (molecular weight 2800, OH number 47)-MDI adduct
(5) Polytetrahydrofuran (molecular weight 1000, OH number 110)-MDI adduct
(6) Polypropylene glycol/castor oil (mixture) 2,4-tolylene diisocyanate adduct
(7) Polycaprolactone (molecular weight 2000, OH number 56)-MDI adduct
(8) Polyester diol (ester of adipic acid/isophthalic acid and diethylene glycol; molecular weight 1900, OH number 58)-MDI adduct

TABLE 1

| | Adhesives | | | | |
|---|---|---|---|---|---|
| Substance | I | III | V | VII | IX |
| 1 | 30 | 30 | 20 | 30 | 20 |
| 2 | 70 | 30 | 40 | 30 | — |
| 3 | — | 40 | — | — | 20 |
| 4 | — | — | 40 | — | — |
| 5 | — | — | — | 20 | 20 |
| 6 | — | — | — | 20 | 20 |
| 7 | — | — | — | — | — |
| 8 | — | — | — | — | 20 |

TABLE 1a

| | Comparison Tests | | | | |
|---|---|---|---|---|---|
| | Adhesives | | | | |
| Substances | II | IV | VI | VIII | X |
| 1 | — | — | — | — | — |
| 2 | 100 | 30 | 50 | 40 | 20 |
| 3 | — | 70 | — | — | 20 |
| 4 | — | — | 50 | — | — |
| 5 | — | — | — | 30 | 20 |
| 6 | — | — | — | — | 20 |
| 7 | — | — | — | 30 | — |

TABLE 1a-continued

| | Comparison Tests | | | | |
|---|---|---|---|---|---|
| | Adhesives | | | | |
| Substances | II | IV | VI | VIII | X |
| 8 | — | — | — | — | 20 |

Flocking adhesives I-X in Tables 1 and 1a were used for the flocking tests. To this end, rubber plates (15×20 cm) of SBR (mixture A), CR (mixture B) and EPDM (mixture C) were produced under the conditions specificed earlier. The surfaces of the rubber plates were cleaned by washing with xylene, spread-coated with the adhesives and then electrostatically flocked. 0.75 mm long polyester fibers were used for flocking. The adhesives were dried for about 10 minutes at 120° C. After storage for about 10 to 15 hours at room temperature, the flocked rubber plates were subjected to an abrasion test in which fastness to rubbing was determined using a spike. The results of the test are shown in Table 2.

The abrasion test was carried out by means of a FEK-VESLIC abrasion tester of the type manufactured by the Kueny Company (Muttenz, Switzerland). In the abrasion test, a chisel-like tool under a weight of 500 g is passed over the flocked test specimen (frequency 40 mins$^{-1}$) in accordance with the test normally applied in the leather industry.

TABLE 2

| | Number of cycles | | |
|---|---|---|---|
| Adhesives | Mixture A | Mixture B | Mixture C |
| I | 80–90 | 60–90 | 50–70 |
| II | 40–50 | 20–40 | 5–10 |
| III | 50–60 | 40–50 | 40–50 |
| IV | 20–30 | 30–40 | 5–10 |
| V | 90–100 | 100–110 | 60–70 |
| VI | 30–40 | 40–50 | 10–20 |
| VII | 90–100 | 120–140 | 80–90 |
| VIII | 50–60 | 60–70 | 30–40 |
| IX | 100–120 | 100–120 | 40–50 |
| X | 70–80 | 40–50 | 20–30 |

The test specimens produced as described above were stored for 5 days in hot water (80° C.). They were then removed from the water, dried and subjected to the abrasion test after storage for about 1 to 2 hours at room temperature. The results are shown in Table 3.

TABLE 3

| | Number of cycles | | |
|---|---|---|---|
| | Storage in water for 5 days at 80° C. | | |
| Adhesives | Mixture A | Mixture B | Mixture C |
| I | 10–15 | 15–20 | 10–15 |
| II | 5–8 | 3–5 | 3–5 |
| III | 15–20 | 15–20 | 10–15 |
| IV | 10–12 | 10–12 | 8–10 |
| V | 15–20 | 15–20 | 15–20 |
| VI | 5–10 | 10–12 | 5–10 |
| VII | 15–20 | 20–25 | 15–20 |
| VIII | 5–8 | 10–12 | 5–8 |
| IX | 20–25 | 25–30 | 20–25 |
| X | 10–15 | 14–18 | 8–10 |

EXAMPLE

Adhesives were prepared by dissolving and dispersing two or more of the following substances as shown in Table 4, in a solvent mixture of xylene, toluene and methylisobutyl ketone in a ratio of 1:1:1 (50% solids):
1. Triglycidyl isocyanurate-4,4'-diphenylmethane diisocyanate adduct (molar ratio 1:3)
2. Polypropylene glycol (molecular weight approx. 1000, OH number 110)-4,4'-diphenylmethane diisocyanate adduct (molar ratio 1:2)
3. Castor oil (OH number 161, trifunctional)-4,4'-diphenylmethane diisocyanate adduct (molar ratio 1:3)
4. p-dinitrosobenzene (solid) Adhesives XI - XIV are shown in Table 4 below:

TABLE 4

| Substance | XI | XII | XIII | XIV |
|---|---|---|---|---|
| 1 | 30 | 30 | 30 | 27.5 |
| 2 | 70 | 68 | 30 | 30 |
| 3 | — | — | 40 | 40 |
| 4 | — | 2 | — | 2.5 |

Rubber plates (15×20 cm) of styrene-butadiene rubber (SBR) and ethylene-propylene-diene polymer rubber (EPDM) were produced in the same manner as described earlier. The surfaces of the rubber plates were cleaned by washing with xylene, spread-coated with the adhesives and then electrostatically flocked. 0.75 mm long polyester fibers were used for flocking. The adhesives were dried for about 10 minutes at 120° C. After storage for about 10 to 15 hours at room temperature, the flocked rubber plates were subjected to an abrasion test using a spike to determine their fastness to rubbing. The results are shown in Table 5 below:

TABLE 5

| | Number of cycles | |
|---|---|---|
| Adhesives | Mixture A | Mixture C |
| XI | 80–90 | 50–70 |
| XII | 150–200 | 200–250 |
| XIII | 50–60 | 40–50 |
| XIV | 100–120 | 120–150 |

The abrasion test was then repeated after the test specimens had been stored for 5 days in water heated to 80° C. The results are shown in Table 6 below:

TABLE 6

| | Number of cycles | |
|---|---|---|
| | Storage in water for 5 days at 80° C. | |
| Adhesive | Mixture A | Mixture C |
| XI | 10–15 | 10–15 |
| XII | 30–40 | 40–50 |
| XIII | 15–20 | 10–15 |
| XIV | 30–35 | 40–45 |

What is claimed is:
1. An adhesive composition for use in the electrostatic flocking of flexible substrates comprising
(a) at least one isocyanate-terminated polyurethane prepolymer,
(b) from about 10 to 80% by weight, based on the weight of component (a), of at least one reaction product of a polyfunctional epoxide with an aromatic diisocyanate, as an adhesion promoter, and, optionally, one or more of the following:
(c) an organic solvent,
(d) a dispersant, and
(e) other auxiliary materials.
2. An adhesive composition in accordance with claim 1 wherein component (b) is present in from about 20 to about 50% by weight.
3. An adhesive composition in accordance with claim 1 wherein component (b) is a reaction product of a cyclic N-glycidyl compound with an aromatic diisocya- nate in a ratio of one mole of diisocyanate per mole of expoxide group.

4. An adhesive composition in accordance with claim 3 wherein component (b) is a reaction product of one or more of the following compounds: triglycidyl isocyanurate, triglycidyl urazole, diglycidyl benzimidazolone, diglycidyl hydantoin, condensed glycidyl hydantoins with diphenylmethane diisocyanate, tolylene diisocyanate, paraphenylene diisocyanate, and xylylene diisocyanate.

5. An adhesive composition in accordance with claim 1 wherein component (b) is a reaction product of a polyfunctional epoxide compound based on bisphenol A with an aromatic diisocyanate.

6. An adhesive composition in accordance with claim 5 wherein the aromatic diisocyanate is diphenylmethane diisocyanate, tolylene diisocyanate, paraphenylene diisocyanate, or xylylene diisocyanate.

7. An adhesive composition in accordance with claim 1 wherein component (e) is present and is a polyfunctional aromatic nitroso compound.

8. An adhesive composition in accordance with claim 7 wherein the nitroso compound is 1,4-dinitrosobenzene.

9. An adhesive composition in accordance with claim 7 wherein the nitroso compound is present in an amount of from about 0.5 to about 4% by weight, based on the weight of the solvent-free adhesive composition.

10. An adhesive composition in accordance with claim 9 wherein said amount is from about 1.5 to about 2.5% by weight.

11. An adhesive composition in accordance with claim 1 wherein components (a) and (b) together comprise from about 20 to about 50% by weight of the adhesive composition.

* * * * *